United States Patent
Jaiswal et al.

(10) Patent No.: US 9,183,208 B1
(45) Date of Patent: Nov. 10, 2015

(54) FILESHOT MANAGEMENT

(75) Inventors: Anuja Jaiswal, Sunnyvale, CA (US);
Nikul Patel, Anaheim, CA (US);
Devang K. Shah, San Jose, CA (US)

(73) Assignee: NetApp, Inc., Sunnyvale, CA (US)

(*) Notice: Subject to any disclaimer, the term of this patent is extended or adjusted under 35 U.S.C. 154(b) by 867 days.

(21) Appl. No.: 12/978,444

(22) Filed: Dec. 24, 2010

(51) Int. Cl.
*G06F 17/30* (2006.01)
*G06F 11/14* (2006.01)

(52) U.S. Cl.
CPC ...... *G06F 17/30088* (2013.01); *G06F 11/1446* (2013.01); *G06F 17/30067* (2013.01); *G06F 17/3023* (2013.01)

(58) Field of Classification Search
CPC ............ G06F 17/30088; G06F 17/30073; G06F 17/30091; G06F 11/1446; G06F 17/30067; G06F 17/3023; Y10S 707/99931; Y10S 707/9995
See application file for complete search history.

(56) References Cited

U.S. PATENT DOCUMENTS

| | | | | |
|---|---|---|---|---|
| 7,483,929 | B2* | 1/2009 | Kulkarni et al. | 1/1 |
| 7,822,726 | B1* | 10/2010 | Cardin | 707/702 |
| 8,005,797 | B1* | 8/2011 | Chepel et al. | 707/649 |
| 8,099,572 | B1* | 1/2012 | Arora et al. | 711/162 |
| 8,296,264 | B1* | 10/2012 | Yeresov et al. | 707/646 |
| 2004/0059866 | A1* | 3/2004 | Patel et al. | 711/100 |
| 2005/0065986 | A1* | 3/2005 | Bixby et al. | 707/204 |
| 2006/0026220 | A1* | 2/2006 | Margolus | 707/204 |
| 2006/0112151 | A1* | 5/2006 | Manley et al. | 707/201 |
| 2006/0242179 | A1* | 10/2006 | Chen et al. | 707/100 |
| 2006/0253724 | A1* | 11/2006 | Zhang | 714/2 |
| 2007/0022117 | A1* | 1/2007 | Keohane et al. | 707/8 |
| 2008/0147962 | A1* | 6/2008 | Diggs et al. | 711/103 |
| 2009/0182785 | A1* | 7/2009 | Aston et al. | 707/203 |
| 2010/0205421 | A1* | 8/2010 | Campbell et al. | 713/2 |
| 2010/0306171 | A1* | 12/2010 | Antos et al. | 707/638 |

OTHER PUBLICATIONS

"File Streams", Retrieved Date: Nov. 10, 2010, http://msdn.microsoft.com/en-us/library/aa364404(VS.85).aspx.
"Windows Streams—An Introduction to File System Streams", The NT Insider, vol. 13, Issue 2, Mar.-Apr. 2006 | Published: Apr. 17, 2006| Modified: Apr. 17, 2006, http://www.osronline.com/article.cfm?article=457.
"Snapshot (computer storage)", Retrieved Date: Nov. 15, 2010, http://en.wikipedia.org/wiki/Snapshot_(computer_storage).
Sawicki, Ed, "BizNix NTFS Streams", Retrieved Date: Nov. 10, 2010, http://www.biznix.org/whylinux/windows/ads.html.
"Hiding Files in Alternate Data Streams", Joe Keohan, Apr. 16, 2010, reprinted from the Internet at: http://jkeohan.wordpress.com/2010/04/16/hiding-files-in-alternate-data-streams/, 6 pgs.
"Dissecting NTFS Hidden Streams", Chetan Grupta, Jul. 17, 2006, reprinted from the Internet at: http://www.forensicfocus.com/dissecting-ntfs-hidden-streams, 14 pgs.

* cited by examiner

*Primary Examiner* — Shew-Fen Lin
(74) *Attorney, Agent, or Firm* — Cooper Legal Group, LLC

(57) ABSTRACT

Many applications and computing environments, such as data storage systems, provide data backup and restoration features. It may be advantageous to provide file level backups that may be accessible to a user through a directory structure of a file system. Accordingly, fileshots comprising backup data of a file may be stored as metadata of the file. For example, a fileshot may be stored within a stream directory as a hidden stream linked off of the file. Fileshots may be associated within a directory interface (e.g., a command prompt or graphical user interface), which may be presented to a user. In this way, the user may access and/or manage fileshots through the directory interface (e.g., the user may create fileshots, restore files with fileshots, copy fileshots, etc.). Additionally, fileshot metadata may be maintained for fileshots. The fileshot metadata may be used to locate fileshot and/or perform fileshot commands.

25 Claims, 8 Drawing Sheets

FILESHOT MANAGEMENT

FIELD

The instant disclosure pertains to managing backups of a file as hidden metadata of the file within a file structure.

BACKGROUND

Business entities and consumers are storing an ever increasing amount of digitized data. For example, many commercial entities are in the process of digitizing their business records and/or other data. Similarly, web based service providers generally engage in transactions that are primarily digital in nature. Thus, techniques and mechanisms that facilitate efficient and cost effective storage of vast amounts of digital data are being implemented. For example, a cluster network environment may be implemented as a data storage system that facilitates the storage, retrieval, and/or processing of data.

Backup schedules, data replication services, versioning control, and/or data restoration policies may be implemented to mitigate unrecoverable data loss that may otherwise result from hardware failures, such as a data storage device failure, and/or software failures. For example, a cluster network environment may implement a data replication task that may copy and store data across a plurality of nodes within the cluster network environment. In case of a node failure and/or data loss, one or more nodes within the cluster network environment may comprise replicated data of the failed node that may otherwise have been permanently lost.

Current backup and restore techniques may be implemented at a system-wide level, a volume level, an application level, and/or a manual user level. In one example, a data storage system may implement a backup schedule to copy data from primary data storage devices to secondary data storage devices. For example, the data may be backed up as volume snapshots. Volume snapshots provide for the creation of backup snapshots of data at a volume level. In another example, a text editor application may store backup data of text documents, which may be used to restore the text documents within the text editor application. In another example, a user may merely copy an original file as a backup file.

Many backup and restore techniques provide file backup by creating an entire copy of the data. As user data grows, replicating an entire set of data may be an inefficient use of resources (e.g., processing time, storage space, etc.). In addition, many applications may provide backup and restore features through the application's user interface. However, backups created by the application may be accessible merely through the application user interface, and may be restricted by specific conditions and policies of the application. Thus, a user may be unable to navigate a file structure to access and/or manage the backups (e.g., the user may be unable to view and/or perform backup/restore commands). Unfortunately, current backup and restore techniques may not provide file level backup management that may be accessible to users through a file structure. Additionally, currently volume level backup techniques may be limited with respect to a number of snapshots that may be made of a volume.

SUMMARY

This disclosure relates to one or more techniques and/or system for providing access to fileshots through a directory interface of a file structure. It may be appreciated that a file structure may maintain data using a hierarchical structure of files, folders, directories, and/or other data entities. Such data may be stored within a data storage system, such as data storage system 200 of FIG. 2, and may be accessible within a cluster network environment, such as cluster network environment 100 of FIG. 1, for example. The directory interface may be an interface into the file structure, such as a command prompt or a graphical user interface. In one example, fileshots may be made accessible through a command line directory interface, such that a user may issue restore, backup, delete, schedule, and/or other commands to manage fileshots. In another example, fileshots may be made accessible through a GUI directory interface, such that a user may issue show, open, copy, cut, read, delete and/or other commands to manage fileshots.

It may be appreciated that the term file or the like as used herein is not meant to be construed in a limiting sense, but may be interpreted as data represented at a finer or broader granularity, for example (e.g., a block of data, a logical unit number (LUN), bits of data, a volume of data, a virtual volume, and/or any other data object at various granularities).

It may be appreciated that a fileshot may be a point in time backup of a file. The fileshot may be implemented as metadata describing backup data of the file. In one example, the fileshot may be stored as a stream, such as a hidden stream, linked off of and/or otherwise associated with the file. That is, the link between the stream and the file may describe an association of/between the fileshot and the file (e.g., where data corresponding to the file may actually be located). A stream (e.g., a fileshot) of a file may be stored within a stream directory linked off of the file. .Fileshots of the file may be stored as hidden streams within the stream directory. In one example, when a fileshot is created, the fileshot may clone a source file or a portion thereof into a hidden stream (e.g., the fileshot) stored within a stream directory linked off of the source file. It may be appreciated that streams may be used by operating system functionality to store metadata about a file linked off the stream.

It may be appreciated that a fileshot may comprise backup data of a file. In one example, the fileshot may comprise backup data of the entire file (e.g., a duplicate of the file). In another example, the fileshot may comprise less than all data of the file. As an example, a fileshot may merely comprise backup data corresponding to a difference between a previous fileshot of the file (e.g., a last fileshot representing the most recent backup of the file) and a current state of the file. Such a fileshot may be a space efficient copy of merely the difference data of the file.

In one example of providing access to fileshots through a directory interface of a file structure, a fileshot may be stored as metadata of a file with a file structure. For example, the fileshot may be stored as a hidden stream within a stream directory of the file structure. The fileshot may comprise backup data of the file, and may be linked to the file (e.g., the fileshot may be associated with the file that is a separate file than the fileshot). That is, information that the fileshot is related to the file may be maintained as the link between the fileshot and the data.

The fileshot may be associated with a directory interface of the file structure. The directory interface may be presented, for example, as a command line interface or a graphical user interface. In this way, a user may use the directory interface to access, visualize, and/or perform operations associated with fileshots stored within the file structure. For example, user input may be received through the directory interface. The user input may correspond to a show fileshot command (e.g., display fileshot), an open fileshot command, a copy fileshot command, a cut fileshot command, a delete fileshot command, a restore file command (e.g., restore a file with a fileshot linked off the file), a backup policy creation command (e.g., create and store fileshots based upon a specified interval), a schedule fileshot command (e.g., create a fileshot of a file), and/or other fileshot operation commands, for example. The user input may be implemented to perform the corresponding commands. The implementation of a command may utilize fileshot metadata describing fileshots of files (e.g., an inode number within the fileshot metadata may be used to locate and/or access particular fileshots of the file).

It may be appreciated that managing fileshots through a directory interface of a file structure allows users to specify backup and restore policies at a fine granularity, such as at a file level as opposed to a volume level. For example, a user may set a file by file backup policy for particular files. Additionally, a user may manage fileshots without reliance upon a managing application and/or the original file because the user may directly manage the fileshots through the directory interface.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
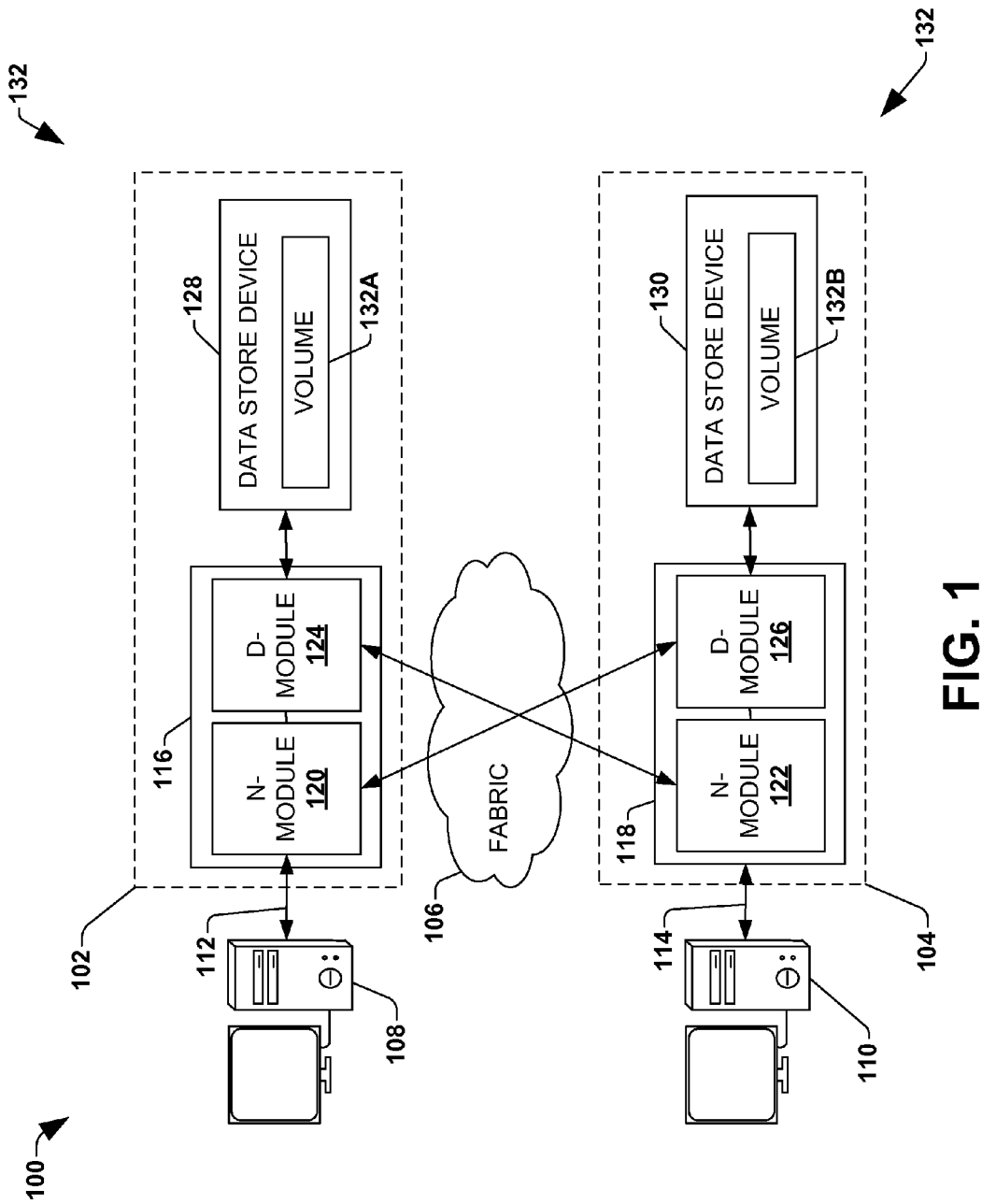
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

Today, users may create, store, share, and/or utilize information as electronic data. In one example, a consumer may create, store, and share image data within a social network environment. In another example, a business entity may store, access, and process large amounts of data, such as text documents, spreadsheets, program files, and/or other data within a data storage system implemented within a cluster network environment. Many consumers and business entities employ data backup and restoration techniques to protect their data. In one example, a consumer may manually backup data to an external drive and/or upload data to a storage web service. In another example, a business entity may backup data to remote secondary storage devices, create volume snapshots of data, and/or implement other backup and recovery techniques to mitigate potential data loss in the event of a hardware and/or software failure.

Many current backup and restore techniques are implemented at a volume level. For example, a cluster network environment, such as cluster network environment 100 of FIG. 1, may provide a client with raw storage, which may be externally presented to the client as a LUN, a logical unit number, representing data storage disks and volumes. Internally, the LUN may be a file distributed throughout the cluster network environment. Currently, a client may be limited to volume level snapshots and/or broad backup policies within the cluster network environment (e.g., broad backup policies may not provide a user with the ability to specify fine grained backup commands, such as at a file granularity). It may be appreciated that virtual machines may be implemented within the cluster network environment. However, many virtual machine management policies are performed by volume level tasks. Thus, backup and restore techniques of the cluster network environment may be limited to volume level tasks, even though merely a few files may be desired for backup. Unfortunately, a client may be unable to perform backup and restore techniques at a file level using a directory interface, such as a command prompt or graphical user interface.

Many applications may provide specific backup and restore features for files associated with the applications. These backup and restore features may be invoked through an application user interface of the application, and may be limited to specific constraints and policies of the application. Unfortunately, the user may be unable to create, view, and/or restore backups of such files without the aid of the application.

Many current backup and restore techniques, such as snapshots, backup entire volumes of data. However, backing up the entire data may waste unnecessary space. For example, a volume of user data may comprise millions of files, such that a volume snapshot may comprise the entire set of data within the volume. Even though the user may merely desire to backup a few of the files, the user may be limited to backing up the entire volume. Additionally, many backup and restore techniques backup entire files, as opposed to merely the difference in the file since the last backup. For example, a large file that is to be backed up may have had minor changes since the last backup (e.g., a few characters within a 25 mb file may have changed). However, the entire file may be backed up, thus wasting storage space and/or processing resources. Unfortunately, current backup and restore techniques may not efficiently utilize resources (e.g., processing time and/or storage space) because such techniques may limit the user to volume level backups where entire files are backed up, instead of allowing the user to specify backup policies at a finer granularity, such as at a file level, where merely changes to the file are backed up.

Accordingly, one or more techniques and/or system for providing access to fileshots through a directory interface of a file structure are provided herein. In particular, fileshots of a file may be stored as metadata of the file within the file structure. For example, a fileshot may be stored as a hidden stream linked off the file (e.g., the link may represent an association between the fileshot and the file, even though the fileshot and the file may be separate data entities). It may be appreciated that streams have been generally used to associate additional information with a file in a manner that may be transparent to applications using the file. The fileshot may comprise backup data of the file (e.g., the entire file data or a portion thereof, such as difference data between the current version of the file and a previous fileshot of the file). The fileshots may be accessible through the directory interface of the file structure. This allows a user to manage the fileshots through the directory interface. The user may be able to create snapshots at a file level (fileshot), create backup policies at a file level, copy a fileshot into a file, restore a file to a previous version represented by a corresponding fileshot, and/or perform various other tasks through the directory interface.

Figure 2:
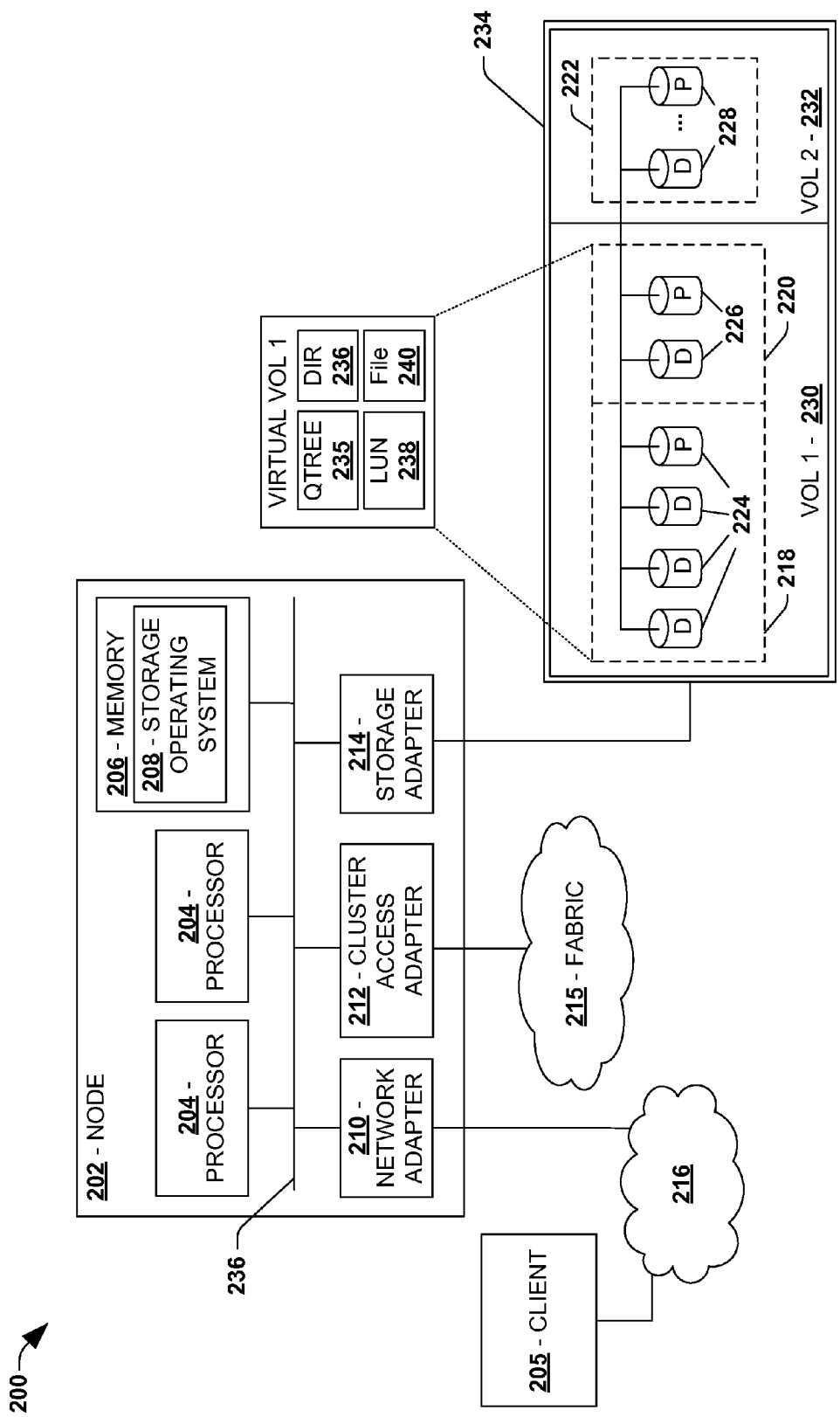
FIG. 2 is a component block diagram illustrating an example data storage system in accordance with one or more of the provisions set forth herein.

To provide a context for an embodiment for providing access to fileshots through a directory interface of a file structure, FIG. 1 illustrates a cluster network environment 100, for example, which may comprise a file structure within which fileshots of files may be created and/or managed, and FIG. 2 illustrates an embodiment of a data storage system that may be implemented to facilitate the management of fileshots, for example. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

FIG. 2 is an illustrative example of a data storage system 200, providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent each volume stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

Among other things, one or more systems and/or techniques for providing access to fileshots through a directory interface of a file structure are disclosed herein. It may be appreciated that data, such as user data files, may be stored within data storage system 200 of FIG. 2 and/or data storage systems 102, 104 of FIG. 1. Such data may be backed up as fileshots within a file structure of the data storage systems 102, 104, and/or 200. Accordingly, the one or more systems and/or techniques may be implemented to provide access to the fileshots within the file structure through the directory interface. In this way, a user may access and/or manage the fileshots using the directory interface.

Figure 3:
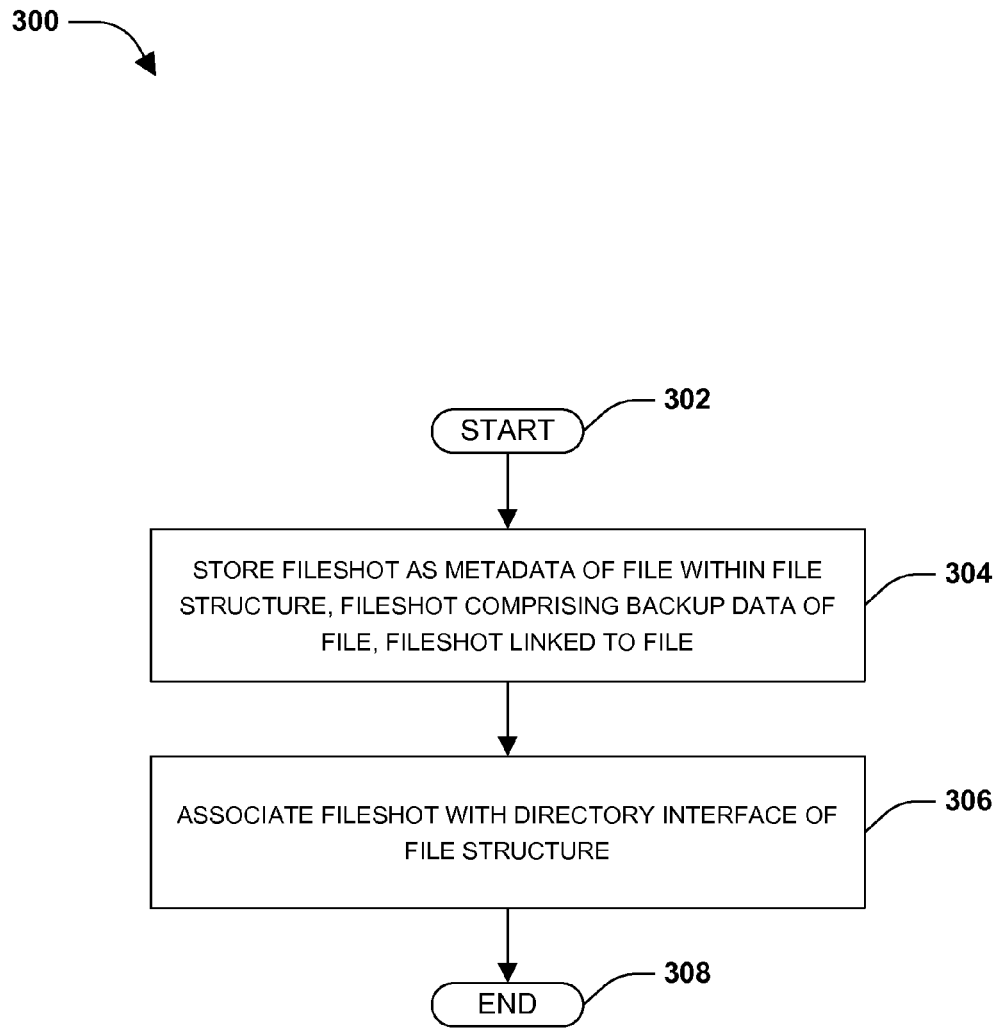
FIG. 3 is a flow chart illustrating an exemplary method of providing access to fileshots through a directory interface of a file structure.

One embodiment of providing access to fileshots through a directory interface of a file structure is illustrated by an exemplary method 300 in FIG. 3. At 302, the method starts. At 304, a fileshot may be stored as metadata of a file within a file structure. The fileshot may comprise backup data of the file (e.g., backup data of the file or a portion thereof, such as difference data corresponding to changes to the file since a previous fileshot). The fileshot may be linked off of the file. That is, the link may correspond to an association between the fileshot and the file, even though the fileshot and the file may be separate data entities. In one example, the fileshot may be stored as a hidden stream within a stream directory. In particular, the fileshot may be attached to (linked off of) the file as the hidden stream, such that an association between the fileshot and the file may be maintained. In one example, the stream directory may be linked off of the file. For example, a Stream Directory A may be linked off of File A and may comprise fileshots of File A, a Stream Directory B may be linked off of File B and may comprise fileshots of File B, etc.

It may be appreciated that the file structure may be implemented within a data storage system of a cluster network environment (e.g., data storage system 200 of FIG. 2 and/or data storage systems 102, 104 of FIG. 1). In one example, the file structure may be a network file system (NFS). In another example, the file structure may be a common internet file systems (CIFS).

Figure 6:
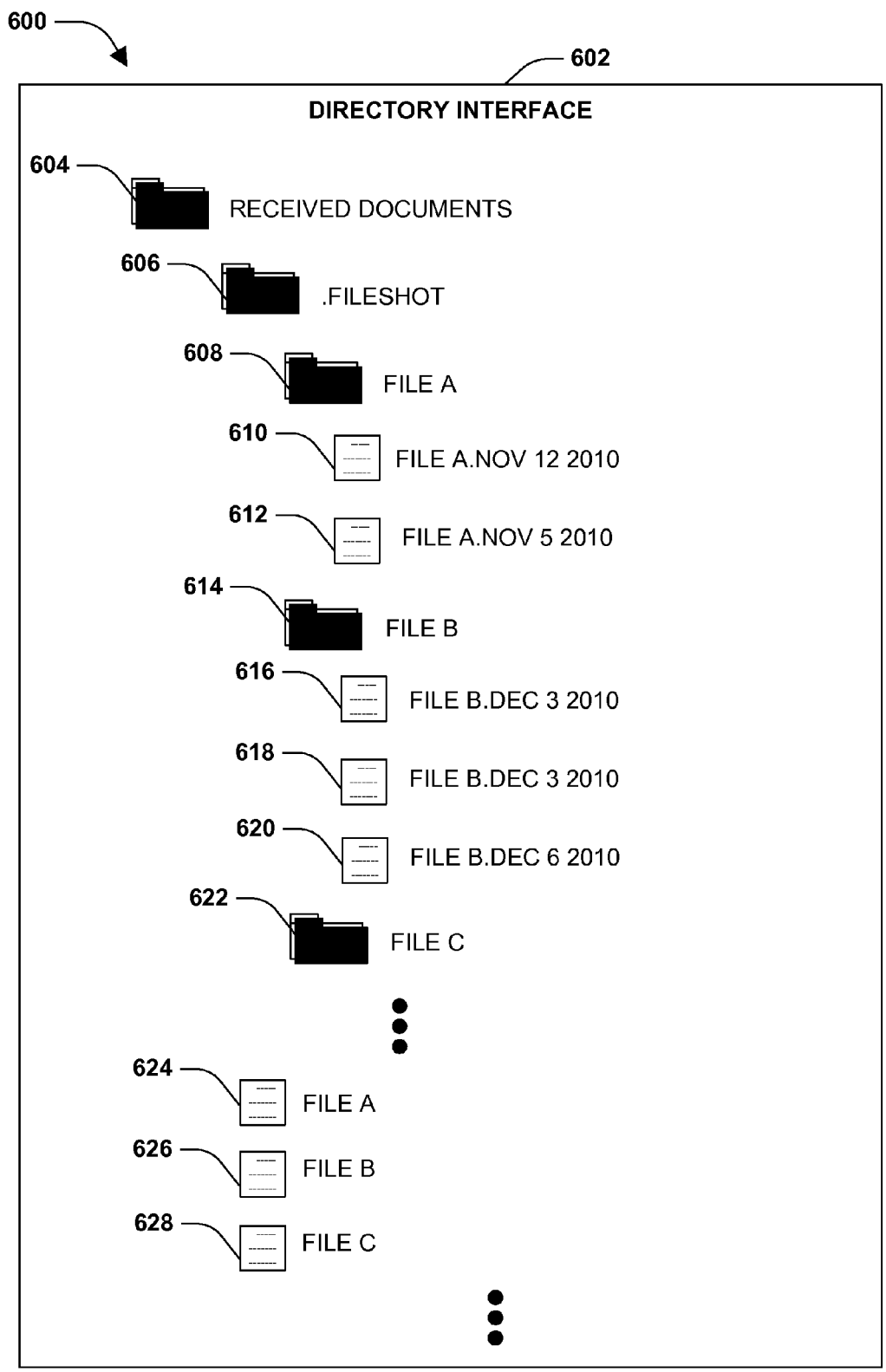
FIG. 6 is an illustration of an example of a directory interface of a file structure.

At 306, the fileshot may be associated with a directory interface of the file structure, such that the fileshot may be accessible through the directory interface (e.g., directory interface 602 of FIG. 6). In one example, the directory interface may be a command prompt providing access to the fileshots. In another example, the directory interface may be a file viewing graphical user interface configured to provide visual details of the fileshots.

The directory interface may be presented to a user so that the user may access and/or manage the fileshot and/or other fileshots within the file structure. It may be appreciated that access may be provided to the fileshot through the directory interface notwithstanding a loss of the file linked to the fileshot and/or a loss of an application associated with the file. For example, a user may access a fileshot of a spreadsheet file through the directory interface, even though the spreadsheet file may have been lost (destroyed) and/or a spreadsheet application may have been lost (inoperable). In this way, the user may recover the spreadsheet file and/or manage backups of the spreadsheet file regardless of whether the spreadsheet file and/or the spreadsheet application exist and/or are operable.

It may be appreciated that user input may be received through the directory interface (e.g., a user may input commands into a command prompt, a user may input commands into a graphical user interface visually representing the file structure, etc.). For example, the user input may correspond to a show fileshot command (e.g., display a representation of one or more fileshots within the directory interface), an open fileshot command, a restore file command (e.g., restore a file with a fileshot linked to the file), a delete fileshot command, a copy fileshot command, a cut fileshot command, and/or other fileshot operation commands. In this way, the user may manage the fileshot (e.g., and associated file) by interacting with the fileshot through the directory interface.

In one example of a user managing the fileshot through the directory interface, user input corresponding to a fileshot schedule for the file may be received through the directory interface. The fileshot schedule may specify a schedule for creating fileshots of the file (e.g., a onetime creation of a fileshot, a reoccurring schedule for creating one or more fileshots over time, etc.). In this way, a second fileshot of the file may be generated as a second stream within the stream directory of the file structure, where the second fileshot may be linked to the file (e.g., the second fileshot may be created within a directory corresponding to the file).

In another example of a user managing the fileshot through the directory interface, user input corresponding to a backup policy for the file may be received through the directory interface. The backup policy may specify a backup schedule for creating fileshots of the file. In this way, fileshots of the file may be generated at intervals specified by the backup policy. The fileshots may be stored as hidden streams at a secondary storage location remote to the file structure (e.g., a different volume, a different storage system, a different storage device, etc.).

Figure 5:
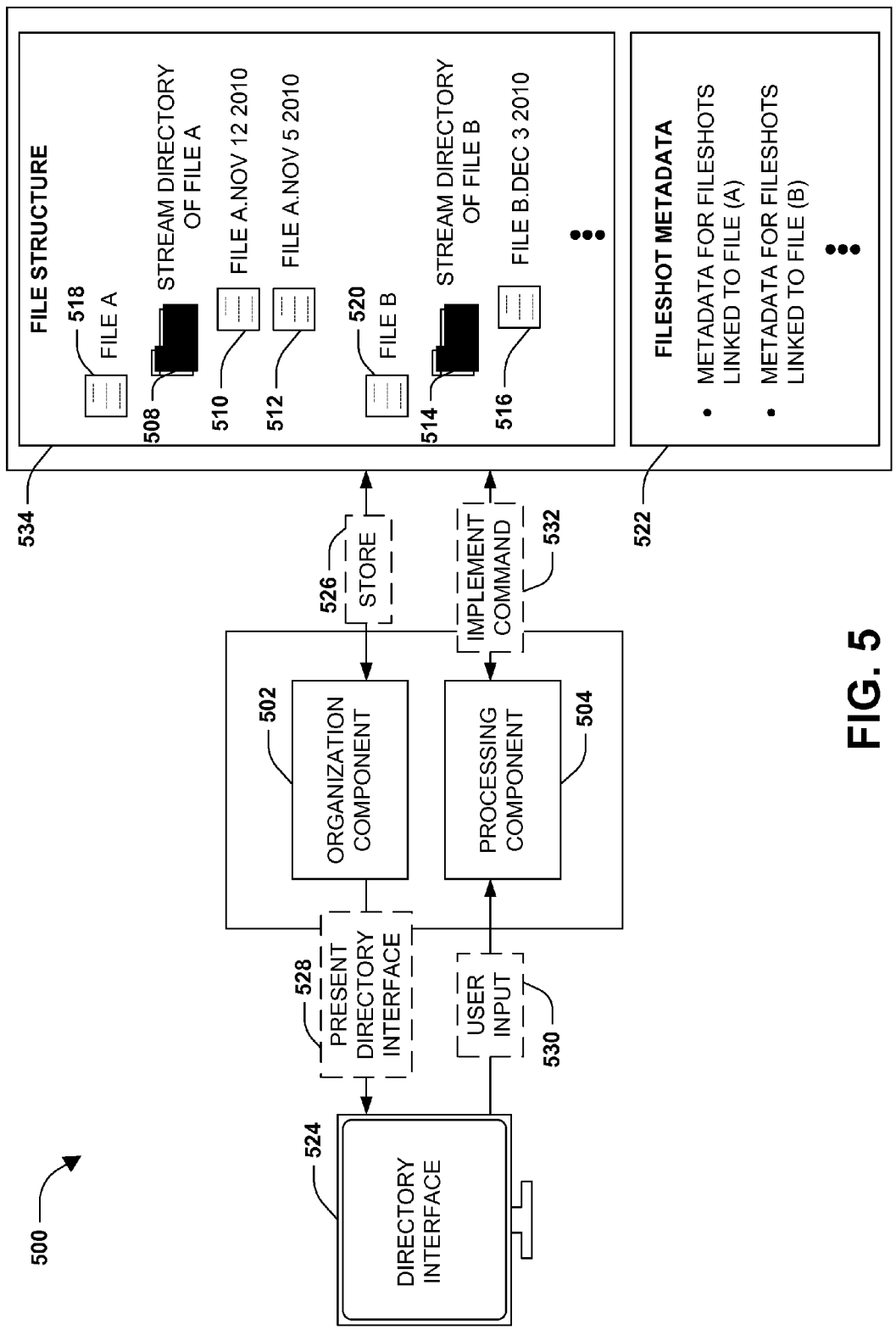
FIG. 5 is a component block diagram illustrating an exemplary system for providing access to fileshots through a directory interface of a file structure.
Figure 7:
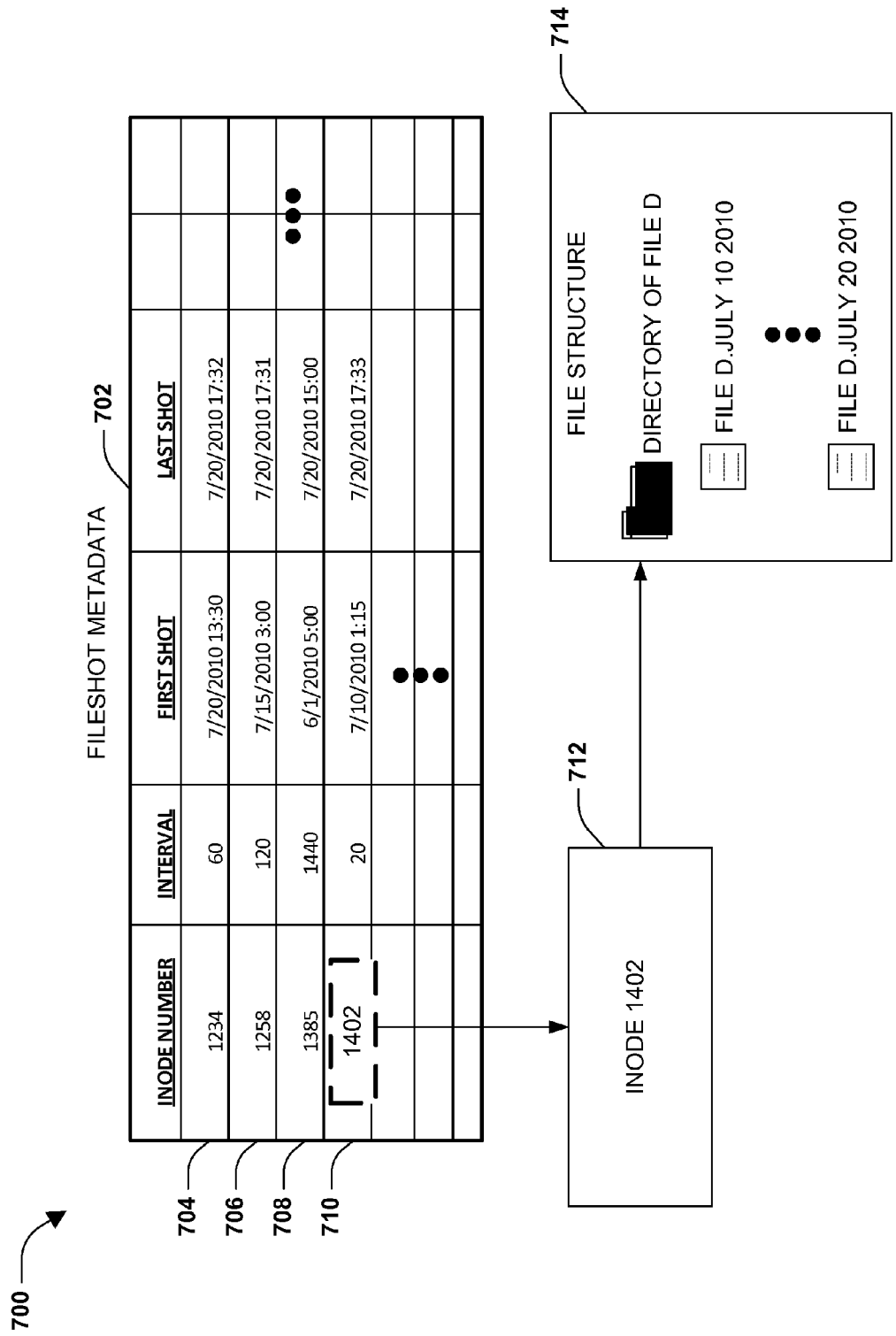
FIG. 7 is an illustration of an example of fileshot metadata.

Fileshot metadata comprising metadata describing fileshots of files may be maintained (e.g., fileshot metadata 522 of FIG. 5 and/or fileshot metadata 702 of FIG. 7). Fileshot metadata may comprise inode numbers, fileshot creation intervals, first shot of a file, last shot of a file, and/or a wide variety of other information regarding fileshots and/or files. For example, fileshot metadata may comprise an inode number referencing an inode file of a stream directory comprising fileshots of a file (e.g., the inode file may be used to locate the fileshot), a fileshot creation interval of the file (e.g., fileshots of the file may be created based upon the fileshot creation interval), a first shot of the file (e.g., an oldest fileshot of the file), a last shot of the file (e.g., a newest fileshot of the file), etc. The fileshot metadata may be updated based upon storing of a fileshot of a file (e.g., a new entry within the fileshot metadata may be created; a last shot of the file may be updated; etc.).

Fileshot metadata may be utilized for many purposes, such as tracking and/or managing fileshots. In one example, fileshot metadata may comprise information regarding an association of a fileshot to a file (e.g., an inode number). The location of the fileshot may be determined by using an inode number within the fileshot metadata to access an inode file associated with the fileshot. The inode file may comprise metadata of the fileshot, access information of the fileshot, and/or other information regarding the fileshot and/or the file with which the fileshot is linked. In this way, the fileshot of the file may be located, for example, when associating the fileshot with the directory interface. In another example, an autodelete policy for fileshots of a file may be implemented using a first shot of the file specified within the fileshot metadata (e.g., the first shot may be an oldest backup version of the file, and thus may be deleted first). In another example, a fileshot schedule for a file may be implemented based upon a fileshot creation interval of the file and/or a timestamp of a last shot of the file. In this way, fileshot metadata may be utilized when managing fileshots. At 308, the method ends.

In another embodiment of providing access to one or more fileshots, a fileshot may be stored as metadata of a data object (e.g., a block of data, a logical unit number (LUN) of data, a volume of data, etc.) within a file structure. The fileshot may comprise backup data of the data object. The fileshot may be linked to the data object. The fileshot may be associated with a directory interface of the file structure. In one example, the fileshot may be made accessible through a command line directory interface, such that a user may issue restore, backup, delete, schedule, and/or other commands to manage fileshots. In another example, the fileshot may be made accessible through a GUI directory interface, such that a user may issue show, open, copy, cut, read, delete and/or other commands to manage fileshots.

Figure 4:
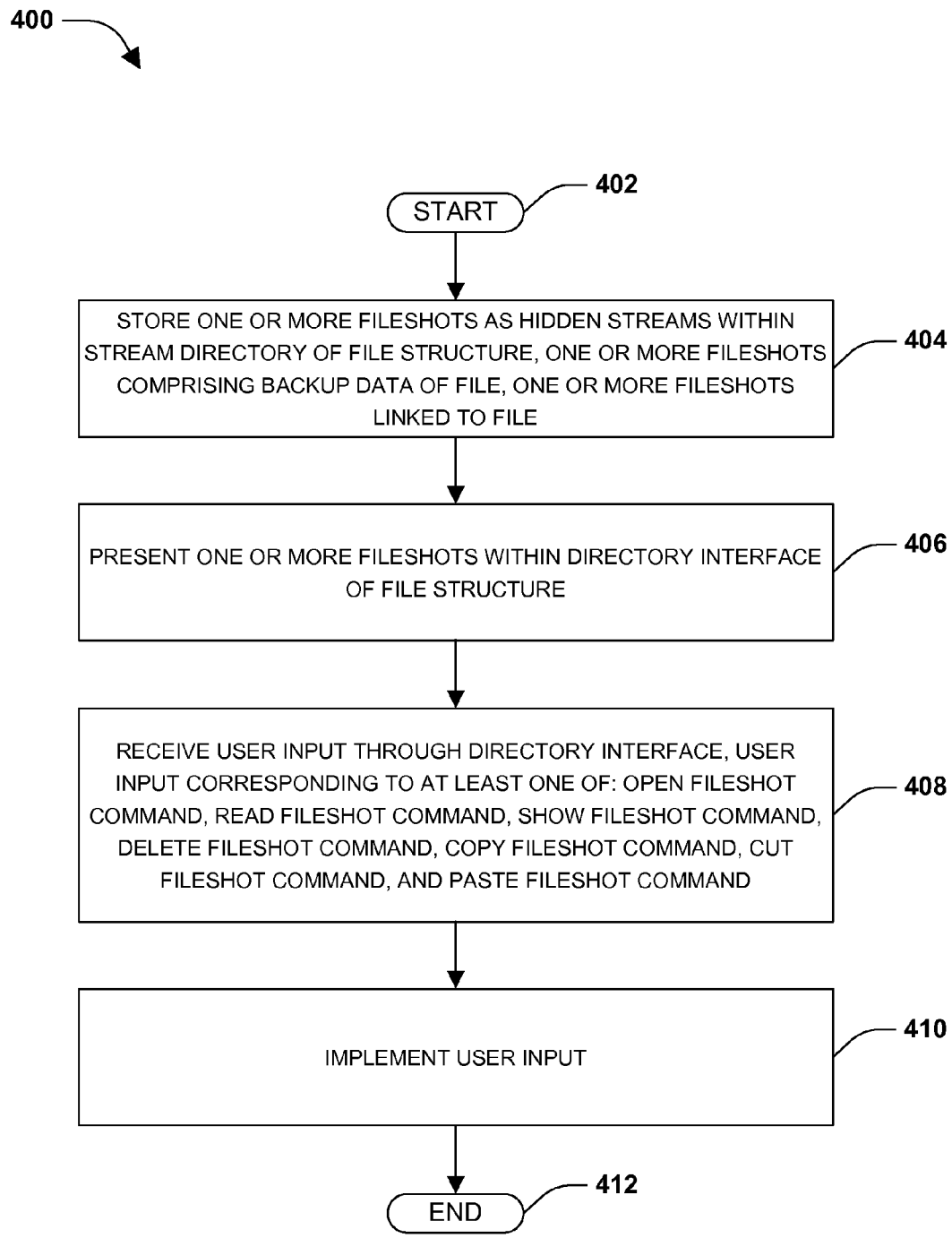
FIG. 4 is a flow chart illustrating an exemplary method of providing access to fileshots through a directory interface of a file structure.

One embodiment of providing access to fileshots through a directory interface of a file structure is illustrated by an exemplary method 400 in FIG. 4. At 402, the method starts. At 404, one or more fileshots may be stored as hidden streams within a stream directory of a file structure. The one or more fileshots may be linked to the file as the hidden streams (e.g., a link may specify a relationship between a fileshot and a file). The one or more fileshots may comprise backup data of the file. At 406, the one or more fileshots may be presented within a directory interface of the file structure. In one example, a GUI directory interface may present the one or more fileshots by displaying the one or more fileshots within a file structure tree (e.g., FIG. 6). In another example, a command line directory interface may present the one or more fileshots by making the fileshots accessible through a command prompt (e.g., a user may issue fileshot commands, such as a restore fileshot command, a backup fileshot command, a schedule fileshot command, a delete fileshot command, and/or other fileshot commands through the command prompt). In this way, the user may access and/or manage fileshots through the directory interface. It may be appreciated that in one example, fileshots, such as hidden streams of fileshots, may not ordinarily be accessible to the user because of the hidden nature of streams.

At 408, user input may be received through the directory interface. In one example, user input within a GUI directory interface may correspond to an open fileshot command (e.g., the fileshot may be opened within a corresponding application, such as a text editor), a read fileshot command, a show fileshot command, a delete fileshot command, a copy fileshot command, a cut fileshot command, a paste fileshot command, and/or other fileshot commands. In another example, user input within a command line directory interface may correspond to a restore file command (e.g., restore a file linked to the fileshot with backup data of the fileshot), a delete fileshot command, a backup policy creation command (e.g., a fileshot creation interval may be specified at which fileshots of a file are to be created), a schedule fileshot command (e.g., create a fileshot), and/or other fileshot commands. At 410, the user input may be implemented. For example, a fileshot of a file may be created as a stream within a stream directory based upon user input of a schedule fileshot command. At 412, the method ends.

FIG. 5 illustrates an example of a system 500 configured to provide access to fileshots through a directory interface 524 of a file structure 534. It may be appreciated that the system 500 may be implemented within a cluster network environment (e.g., cluster network environment 100 of FIG. 1) and/or across one or more data storage systems (e.g., data storage system 200 of FIG. 2 and/or data storage systems 102, 104 of FIG. 1). For example, file structure 534 may correspond to a file system implemented within such data storage systems. The file structure 534 may comprise files, folders, directories, and/or other data entities. For example, the file structure 534 may comprise File A 518 (e.g., a music file), File B 520 (e.g., a block of data), and/or other files not illustrated. The file structure 534 may comprise backup metadata of files, such as fileshots (e.g., Fileshot of File A 510, Fileshot of File A 512, Fileshot of File B 516, etc.). The file structure 534 may comprise stream directories linked off of files. For example, Stream Directory of File A 508 may be linked off of File A 518 and Stream Directory of File B 514 may be linked off of File B 520. A stream directory may comprise fileshots of a file with which the stream directory is linked. For example, Stream Directory of File A 508 may comprise Fileshot of File A 510, Fileshot of File A 512, and/or other fileshots of File A 518 not illustrated. Stream Directory of File B 514 may comprise Fileshot of File B 516 and/or other fileshots of File B 520 not illustrated. It may be appreciated that while fileshots, such as fileshots of File A 518 and fileshots of File B 520, may be referenced as streams, it may be appreciated that fileshots are not limited to being stored as streams, but may be stored as any type of metadata, for example.

The system 500 may comprise an organization component 502 and/or a processing component 504. The organization component 502 may be configured to store 526 a fileshot as metadata of a file (e.g., Fileshot of File A 512, Fileshot of File B 520, etc.) within the file structure 534. The fileshot may comprise backup data of the file (e.g., Fileshot of File A 512 may comprise backup data of File A 518, such as difference data corresponding to changes made to File A 518 since a previous fileshot was created). The fileshot may be linked to the file, such that there may be an association that the fileshot may comprise backup data of the file (e.g., Fileshot of File A 512 may be stored within the stream directory 506 as a hidden stream linked off of File A 518). The organization component 502 may be configured to associate the fileshot with the directory interface 524 of the file structure 534. For example, the organization component 502 may make the file accessible and/or visible through the directory interface 524, such that a user may access and/or manage the fileshot using the directory interface 524. The organization component 502 may be configured to present 528 the directory interface 524 to the user.

The organization component 502 may be configured to maintain fileshot metadata 522. Fileshot metadata 522 may comprise information describing fileshots of files, such as metadata for fileshots linked to File A, metadata for fileshots linked to File B, etc. For example, fileshot metadata 522 may comprise metadata for fileshots linked to File A, such as an inode number referencing an inode file associated with fileshots of File A 518 (e.g., Stream Directory of File A 508, etc.). Information within the inode file may be used to locate fileshots of File A 518. In this way, the organization component 502 may locate fileshots of File A 518 based upon accessing the inode file associated with the fileshot using the inode number within the metadata for fileshots linked to File A. For example, the organization component 502 may utilize metadata of the fileshot and/or access information of the fileshot comprised within the inode file. Additionally, the metadata for fileshots linked to File A may comprise a fileshot creation interval for File A 518 (e.g., an interval at which fileshots of File A 518 may be created). The metadata for fileshots linked to File A may comprise a first shot of the file and/or a last shot of the file. It may be appreciated that the fileshot metadata 522 may comprise a wide variety of other information regarding fileshots and/or files.

The processing component 504 may be configured to receive user input 530 through the directory interface 524. In one example, user input 530 received through a command line directory interface may correspond to an open fileshot command, a read fileshot command, a show fileshot command, a delete fileshot command, a copy fileshot command, a cut fileshot command, a paste fileshot command, a fileshot operation command, and/or other commands relating to fileshots and/or files. In another example, user input 530 received through a GUI directory interface may correspond to a restore fileshot command, a delete fileshot command, a backup fileshot command, a schedule fileshot command, and/or other commands relating to fileshots and/or files. The processing component 504 may be configured to implement 532 the user input 530. In another example, the user input 530 may correspond to a fileshot schedule for a file and/or a backup policy for the file. The processing component 504 may implement 532 the fileshot schedule for the file (e.g., create a fileshot of a file) and/or implement the backup policy for the file (e.g., schedule creations of fileshots for the file at a specified interval) based upon the user input 530. In this way, the processing component 504 may implement 532 user input 530 to access and/or manage fileshots within a file structure 534.

FIG. 6 illustrates an example 600 of a directory interface 602 of a file structure. It may be appreciated that in one example, the file structure may correspond to one or more data storage systems (e.g., data storage system 200 of FIG. 2 and/or data storage systems 102, 104 of FIG. 1). The directory interface 602 may comprise a command prompt interface, a graphical user interface, and/or any other type of interface that may provide a user with access to fileshots.

In one example, the directory interface 602 may comprise a graphical user interface, within which users may view, navigate, and/or interact with files, folders, directories, fileshots, streams, and/or other data entities. For example, the directory interface 602 may display a received documents folder 604, a .fileshot folder 606 (e.g., a stream directory), File A 624, File B 626, File C 628, and/or other data entities not illustrated (e.g., other files, folders, directories, etc.). A user may navigate the .fileshot folder 606 within the directory interface 602 to view directories corresponding to files, such as File A Directory 608 corresponding to File A 624, File B Directory 614 corresponding to File B 626, File C Directory 622 corresponding to File C 628, and/or other data entities not illustrated. The directories within the .fileshot folder 606 may comprise fileshots of corresponding files. For example, File A Directory 608 may comprise fileshots of File A 624, such as fileshot 610 and fileshot 612. File B Directory 614 may comprise fileshots of File B 626, such as fileshot 616, fileshot 618, and/or fileshot 620. File C Directory 622 may comprise fileshots of File C 628. In this way, the user may view, navigate, and/or issue commands through the directory interface 602 to access and/or manage fileshots.

FIG. 7 illustrates an example 700 of fileshot metadata 702. The fileshot metadata 702 may comprise metadata corresponding to fileshots of files within a file structure 714. The fileshot metadata 702 may be used for various purposes relating to fileshots. In one example, a first shot may be used to implement an autodelete policy (e.g., the oldest fileshots may be deleted first). In another example, a fileshot creation interval and/or a timestamp of a last shot may be used to implement a backup policy (e.g., the fileshot creation interval and the timestamp may be used to determine when to create the next fileshot of a file). In another example, an inode number may be used to locate an inode file comprising metadata of one or more fileshots, access information of the one or more fileshots, and/or other information relating to fileshots and/or files within the file structure 714. In this way, the inode number may be used to locate a fileshot of a file within the file structure 714.

In one example of utilizing fileshot metadata 702, inode numbers within the fileshot metadata 702 may be used to locate fileshots. For example, fileshot metadata 702 may comprise inode number A 704, inode number B 706, inode number C 708, inode number D 710, and/or other inode numbers not illustrated. Respective inode numbers may refer to inode files corresponding to files within the files structure 714. For example, inode number D 710 may reference inode file D 712. Thus, inode number D 710 may be used to access inode file D 712. Inode file D 712 may comprise metadata for fileshots of File D, access information for fileshots of File D, and/or other information regarding File D and/or fileshots of File D. Thus, the inode number D 710 may be used to access inode file D 712, which may be used to access fileshots of file D within the file structure 714. For example, inode file D 712 may comprise information referring to Directory of File D comprising fileshots of file D. In this way, fileshot metadata 702 may be used to access and/or manage fileshots of files within file structure 714.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 8:
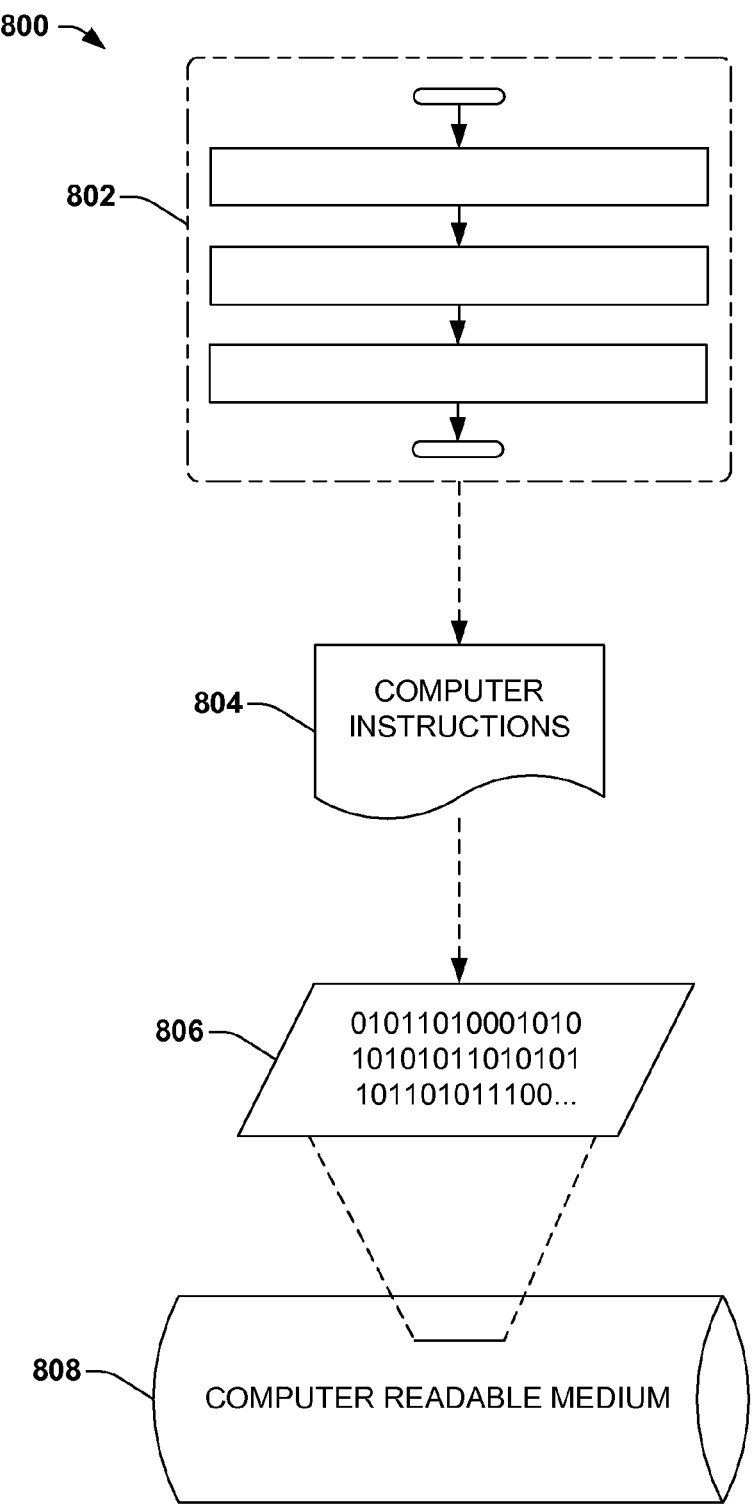
FIG. 8 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 8, where the implementation 800 comprises a computer-readable medium 808 (e.g., a CD-R, DVD-R, platter of a hard disk drive, flash drive, etc.), on which is encoded computer-readable data 806. This computer-readable data 806 in turn comprises a set of computer instructions 804 configured to operate according to the principles set forth herein. In one such embodiment, the processor-executable instructions 804 may be configured to perform a method 802, such as at least some of the method 300 of FIG. 3 and/or at least some of method 400 of FIG. 4, for example, as well as at least some of a system, such as at least some of the system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as may be used herein is intended to encompass a computer program accessible from any computer-readable device, carrier, or media. Of course, those skilled in the art will recognize many modifications may be made to this configuration without departing from the scope or spirit of the claimed subject matter.

It will be appreciated that the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. Also as used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used herein, including the appended claims, may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and/or advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for providing access to a fileshot of a file through an interactive directory interface of a file structure tree, comprising:
   generating a fileshot comprising backup data for a file that is accessible through an operating system directory interface;
   creating fileshot metadata for the file, the fileshot metadata comprising an inode number reference for an inode file of a stream directory, the inode file comprising access information for the fileshot;
   storing the fileshot within a hidden stream of the stream directory that is not accessible through the operating system directory interface, the hidden stream comprising the fileshot, the stream directory comprising a plurality of hidden streams associated with a plurality of fileshots for the file;
   creating a link between the stream directory and the file, the link establishing a backup association between the fileshot within the hidden stream of the stream directory and the file, the link providing access between the file and the fileshot;
   displaying, through the interactive directory interface, the file structure tree corresponding to the stream directory, the file structure tree comprising the file and the stream directory;
   displaying the file, the plurality of hidden streams and the plurality of fileshots through the file structure tree, the interactive directory interface exposing open, modify, or restore fileshot command functionality, the fileshot displayed through the file structure tree, as being associated with the file, using the link; and
   responsive to receiving an open fileshot command through the interactive directory interface, providing, through the file structure tree, access to the fileshot, comprised within the hidden stream, using the access information within the inode file.

2. The method of claim 1, comprising:
   populating the file structure tree based upon a second stream directory comprising a second plurality of hidden streams associated with a second plurality of fileshots for a second file; and
   displaying the second plurality of hidden streams and the second plurality of fileshots through the file structure tree.

3. The method of claim 1, comprising:
   responsive to receiving user interaction with the hidden stream through the file structure tree, implementing a command for the hidden stream corresponding to the user interaction.

4. The method of claim 1, comprising:
   facilitating visual navigation of at least one of the plurality of hidden streams or the plurality of fileshots through the file structure tree.

5. The method of claim 1, comprising:
   responsive to receiving user interaction with the fileshot through the file structure tree, implementing a fileshot command for the fileshot corresponding to the user interaction.

6. The method of claim 1, comprising:
   receiving a fileshot management command through the file structure tree the fileshot management command comprising at least one of the open fileshot command, a modify fileshot command, or a restore file command; and
   implementing the fileshot management command for the fileshot.

7. The method of claim 1, comprising:
   receiving a fileshot management command through the file structure tree, the fileshot management command comprising at least one of a delete fileshot command, a copy fileshot command, or a cut fileshot command; and
   implementing the fileshot management command for the fileshot.

8. The method of claim 1, comprising:
   receiving a fileshot management command through the file structure tree, the fileshot management command comprising at least one of a backup policy command or a fileshot schedule command; and
   implementing the fileshot management command for the fileshot.

9. The method of claim 1, comprising:
   responsive to detecting at least one of an error with respect to the file or a deletion of the file, maintaining the fileshot within the hidden stream of the stream directory for access through the file structure tree notwithstanding the error or the deletion.

10. The method of claim 1, the file stored within a first storage location and the stream directory stored within a second storage location different than the first storage location.

11. The method of claim 10, the first storage location comprising a first storage device and the second storage location comprising a second storage device different than the first storage device.

12. The method of claim 1, comprising:
    displaying, through the file structure tree, one or more selectable commands invokable upon at least one of the hidden stream or the fileshot.

13. The method of claim 1, comprising:
    generating a second fileshot comprising second backup data for the file.

14. The method of claim 13, comprising:
storing the second fileshot within a second hidden stream of the stream directory that is not accessible through the operating system directory interface.

15. The method of claim 13, comprising:
displaying the second fileshot through the file structure tree.

16. The method of claim 15, comprising:
responsive to receiving a second open fileshot command through the interactive directory interface, providing, through the file structure tree, access to the second fileshot.

17. The method of claim 1,
the fileshot metadata comprising a fileshot creation interval for the file.

18. The method of claim 1, comprising:
responsive to detecting a loss of an application used to provide access to the file, maintaining the fileshot within the hidden stream of the stream directory for access through the file structure tree notwithstanding the loss of the application.

19. A system for providing access to a fileshot of a file through an interactive directory interface of a file structure tree, comprising:
one or more processors; and
memory comprising instructions that when executed by at least one of the one or more processors implement at least some of:
an organization component configured to:
generate a fileshot comprising backup data for a file that is accessible through an operating system directory interface;
create fileshot metadata for the file, the fileshot metadata comprising an inode number reference for an inode file of a stream directory, the inode file comprising access information for the fileshot;
store the fileshot within a hidden stream of the stream directory that is not accessible through the operating system directory interface, the hidden stream comprising the fileshot, the stream directory comprising a plurality of hidden streams associated with a plurality of fileshots for the file; and
create a link between the stream directory and the file, the link establishing a backup association between the fileshot within the hidden stream of the stream directory and the file, the link providing access between the file and the fileshot; and
a processing component configured to:
display, through the interactive directory interface, the file structure tree corresponding to the stream directory, the file structure tree comprising the file and the stream directory;
display the file, the plurality of hidden streams and the plurality of fileshots through the file structure tree, the interactive directory interface exposing open, modify, or restore fileshot command functionality, the fileshot displayed through the file structure tree, as being associated with the file, using the link; and
responsive to receiving an open fileshot command through the interactive directory interface, provide, through the file structure tree, access to the fileshot, comprised within the hidden stream, using the access information within the inode file.

20. The system of claim 19, the processing component configured to:
facilitate visual navigation of at least one of the plurality of hidden streams or the plurality of fileshots through the file structure tree.

21. The system of claim 19, the organization component configured to:
responsive to detecting at least one of an error with respect to the file or a deletion of the file, maintain the fileshot within the hidden stream of the stream directory for access through the file structure tree notwithstanding the error or the deletion.

22. The system of claim 19, the file stored within a first storage location and the stream directory stored within a second storage location different than the first storage location.

23. The system of claim 22, the fileshot metadata comprising a fileshot creation interval for the file.

24. A non-transitory computer readable medium comprising instructions which when executed at least in part via a processor perform a method for providing access to a fileshot of a file through an interactive directory interface of a file structure tree, comprising:
generating a fileshot comprising backup data for a file that is accessible through an operating system directory interface;
creating fileshot metadata for the file, the fileshot metadata comprising an inode number reference for an inode file of a stream directory, the inode file comprising access information for the fileshot;
storing the fileshot within a hidden stream of the stream directory that is not accessible through the operating system directory interface, the hidden stream comprising the fileshot, the stream directory comprising a plurality of hidden streams associated with a plurality of fileshots for the file;
creating a link between the stream directory and the file, the link establishing a backup association between the fileshot within the hidden stream of the stream directory and the file, the link providing access between the file and the fileshot;
displaying, through the interactive directory interface, the file structure tree corresponding to the stream directory, the file structure tree comprising the file and the stream directory;
displaying the file, the plurality of hidden streams and the plurality of fileshots through the file structure tree, the interactive directory interface exposing open, modify, or restore fileshot command functionality, the fileshot displayed through the file structure tree, as being associated with the file, using the link; and
responsive to receiving an open fileshot command through the interactive directory interface, providing, through the file structure tree, access to the fileshot, comprised within the hidden stream, using the access information within the inode file.

25. A system for providing access to a fileshot of a file through an interactive directory interface of a file structure tree, comprising:
one or more processors; and
memory comprising instructions that when executed by at least one of the one or more processors implement at least some of:

an organization component configured to:
   generate a fileshot comprising backup data for a file that is accessible through an operating system directory interface;
   create fileshot metadata for the file, the fileshot metadata comprising an inode number reference for an inode file of a stream directory, the inode file comprising access information for the fileshot;
   store the fileshot within a hidden stream of the stream directory that is not accessible through the operating system directory interface, the hidden stream comprising the fileshot, the stream directory comprising a plurality of hidden streams associated with a plurality of fileshots for the file; and
   create a link between the stream directory and the file, the link establishing a backup association between the fileshot within the hidden stream of the stream directory and the file, the link providing access between the file and the fileshot; and a processing component configured to:
   display, through the interactive directory interface, the file structure tree corresponding to the stream directory, the file structure tree comprising the file and the stream directory;
   display the file, the plurality of hidden streams and the plurality of fileshots through the file structure tree, the interactive directory interface exposing open, modify, or restore fileshot command functionality, the fileshot displayed through the file structure tree, as being associated with the file, using the link;
   responsive to receiving an open fileshot command through the interactive directory interface, provide, through the file structure tree, access to the fileshot, comprised within the hidden stream, using the access information within the inode file; and
facilitate visual navigation of at least one of the plurality of hidden streams or the plurality of fileshots through the file structure tree.

* * * * *